(No Model.)
E. R. PROCTER.
CULINARY UTENSIL.
No. 349,002. Patented Sept. 14, 1886.
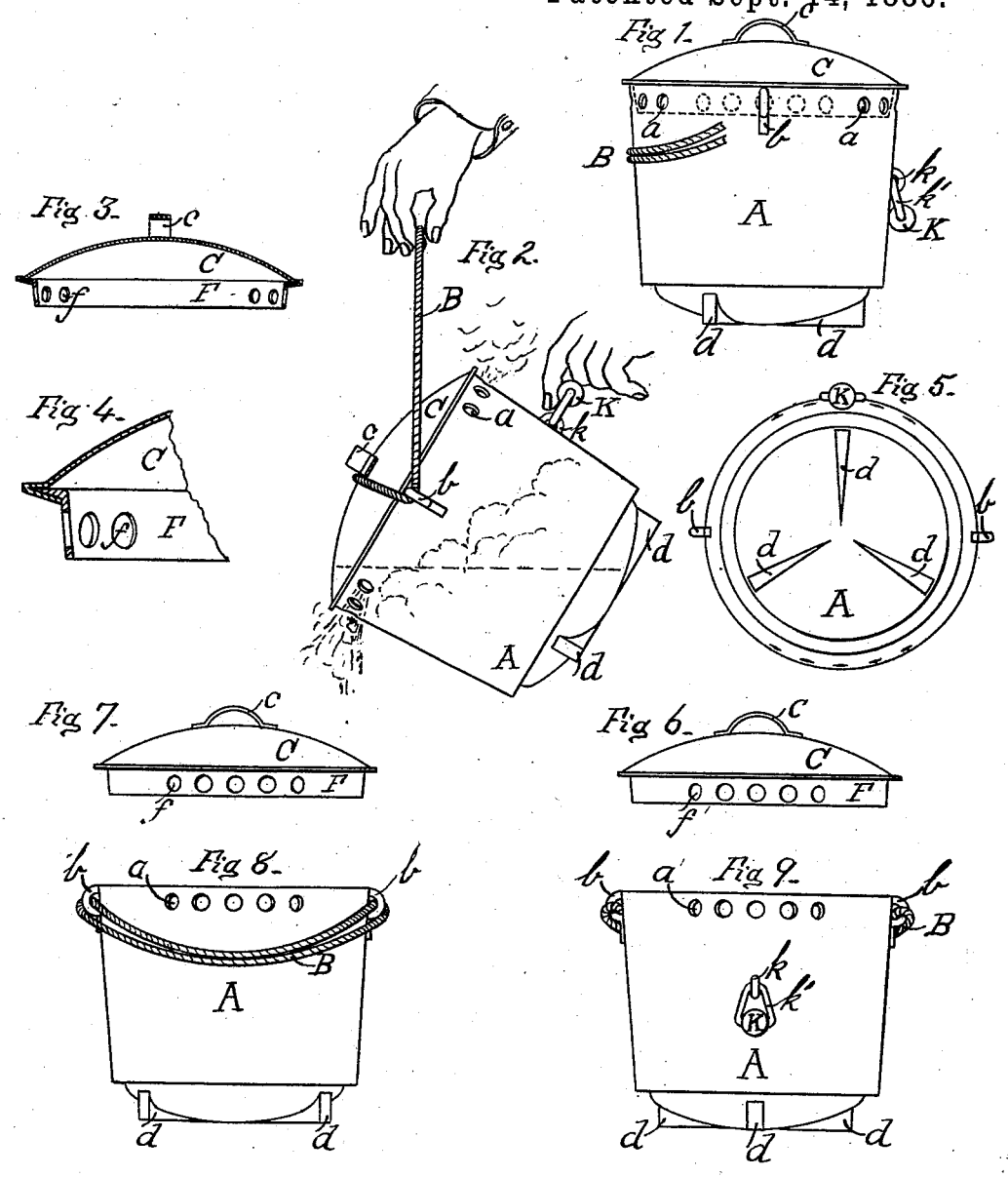

UNITED STATES PATENT OFFICE.

EDWIN R. PROCTER, OF WASHINGTON COURT-HOUSE, OHIO.

CULINARY UTENSIL.

SPECIFICATION forming part of Letters Patent No. 349,002, dated September 14, 1886.

Application filed November 2, 1885. Serial No. 181,580. (No model.)

*To all whom it may concern:*

Be it known that I, EDWIN R. PROCTER, of Washington Court-House, Fayette county, Ohio, have invented a new and useful Improvement in Culinary Utensils and Vessels, of which the following is a specification.

My invention is for improvements in that class of culinary vessels having covers whose contents, liquid and solid, require drainage.

The objects of my invention are, first, to provide drainage for the contents of a covered vessel through series of discharge-holes which can be adjusted to suit the size or density of contents, and which are integral both with vessel and with cover; second, to provide a positive-acting safety-bail for a covered culinary vessel, so that the operation of lifting the said vessel will bind the cover in position and protect the user from steam-scalding by the sudden slipping down and out of cover while in the act of draining off the contents of vessel; third, to provide an improved tripod for said culinary vessels, which will not be liable to descend into the holes in stove-lids, and thus imperil the contents of vessel by tilting over; fourth, to provide the above improvements by simple construction and in forms that may be easily cleaned. I attain these objects by the appliances illustrated in the accompanying drawings, in which—

Figure 1 is a side elevation of vessel with portion of metallic-cord bail cut away, and showing by the dotted lines the bottom line of flange of cover and position of discharge-holes in same relative to similar holes in body of vessel when holes are not adjusted to discharge—to wit, the closed condition of vessel. Fig. 2 is an elevation of same side of vessel, showing latter in the act of being drained—to wit, with the holes in cover-flange registering with similar series of holes in periphery of vessel and the metallic-cord bail firmly holding on the cover. Fig. 3 is a sectional view through the center of the flanged cover. Fig. 4 is a fragment of same section enlarged. Fig. 5 is a view of the bottom of cooking utensil, showing the feet wedge-shaped in plan. Fig. 6 is a rear elevation of flanged cover. Fig. 7 is a front elevation of same cover. Fig. 8 is a front elevation of vessel, showing equal amounts of the endless chain or cord hanging together in front of vessel conveniently for grasping, as a single strand or bail, if desired. Fig. 9 is a rear elevation of vessel, showing tilting-knob.

In the accompanying drawings, A is the vessel, having the series $a$ of discharge-holes, the endless metallic-cord or chain bail B, running freely through the ears $b$, the latter preferably integral with the body of vessel A, the feet $d$, wedge-shaped in plan and flat on the sole, so as to bridge over the holes in the stove-lids, said feet being integral with the body of vessel, and the tilting-knob K, attached to perforated lug $k$ on rear of vessel by link $k'$.

C represents the cover of vessel, having the handle $c$ attached to it in any suitable manner, and the flange F similarly attached and perforated by the series of discharge-holes $f$.

During the process of cooking, the vessel and cover bear, preferably, the relative positions shown in Fig. 1. In draining contents of vessel they bear the relative positions shown, or which may be inferred from Fig. 2—to wit, the series of holes in each come opposite to each other, while the bail automatically binds the cover in position on vessel as the slack of a portion of chain or bail is taken up by the lifting of another portion of same in the act of raising the vessel to drain it, Fig. 2.

It is obvious from inspection of drawings that the cover need not be turned from discharge position shown in Fig. 2 around to the closed condition shown in Fig. 1 (which latter is the preferred position during process of cooking) to effectually close the discharge-holes, since the spaces between the said holes in both the vessel and the flange of cover are made a little wider than the diameters of said holes, so that a slight twist of the cover within the top of vessel which is sufficient to bring a hole in flange of cover behind a space between two holes in body of the vessel will answer the purpose just as effectually.

When it is desired to drain the water off of small articles—as garden-peas—by turning the cover slightly the holes in flange of cover may be made to lap over holes in vessel a sufficient distance to allow the water alone to escape, while the smallest pea is retained in the vessel.

The position of cover-handle relative to ears of vessel allows the user to at all times locate the relative positions of the holes in both cover and vessel at a glance, as when the longer axis of cover-handle is in the plane of the ears of vessel then the series of holes are registering. When said axis is at a right angle to said plane, then the series of holes are closed from one another, as in Fig. 1.

The above-described preferred form of my invention may be modified in some of its details—for example, the holes $a$ (shown in Fig. 9) may be omitted, also the holes $f$, (shown in Fig. 6)—without interfering with the main features of my improvements.

I lay no claim to the combination of a perforated-rim cover with a "boiler constructed with a groove around the top, (the outer edge of the groove should be as high as the top edge of the boiler,) with perforations from the bottom of said groove leading into the boiler," the two series of perforations adapted to register, when the object is to prevent the contents from overflowing, as shown in Patent No. 181,396, August 22, 1876, to Bevin, as I am aware that the same is old.

What I claim as my invention, and desire to secure by Letters Patent, is—

1. A culinary utensil or vessel having an endless metallic-cord or chain bail, in combination with a cover, substantially as set forth.

2. The combination of a culinary utensil, A, having the ears $b$ and bail B, with a cover, C, having a handle, $c$, and flange F, substantially as and for the purpose described.

In testimony of which invention I have hereunto set my hand.

EDWIN R. PROCTER.

Attest:
  Z. HALBROKE,
  WALTER E. MAYNARD.